United States Patent
Raghavani et al.

(10) Patent No.: US 11,937,355 B2
(45) Date of Patent: *Mar. 19, 2024

(54) AUTO DETECTION OF TYPE OF DEVICE USING SINGLE WIRE TWO-WAY COMMUNICATION

(71) Applicant: EATON INTELLIGENT POWER LIMITED, Dublin (IE)

(72) Inventors: Sumeet T. Raghavani, Pune (IN); Grayling Love, Liberty Lake, WA (US); Ahmed El-Gayyar, Senoia, GA (US); Kevin Zhong, Shanghai (CN); Saivaraprasad Murahari, Peachtree City, GA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 36 days.

This patent is subject to a terminal disclaimer.

(21) Appl. No.: 17/555,825

(22) Filed: Dec. 20, 2021

(65) Prior Publication Data

US 2022/0117065 A1   Apr. 14, 2022

Related U.S. Application Data

(63) Continuation of application No. 16/724,937, filed on Dec. 23, 2019, now Pat. No. 11,240,901.

(51) Int. Cl.
*H05B 45/10* (2020.01)
*H04W 4/80* (2018.01)
*H05B 39/08* (2006.01)
*H05B 47/19* (2020.01)

(52) U.S. Cl.
CPC .............. *H05B 47/19* (2020.01); *H04W 4/80* (2018.02); *H05B 39/088* (2013.01); *H05B 45/10* (2020.01)

(58) Field of Classification Search
CPC ................................ H05B 45/10; H05B 47/10
See application file for complete search history.

(56) References Cited

U.S. PATENT DOCUMENTS

| | | | |
|---|---|---|---|
| 8,536,799 B1 * | 9/2013 | Grisamore | H05B 45/3725 315/294 |
| 10,716,191 B1 * | 7/2020 | Zhong | H05B 47/175 |
| 10,798,796 B1 * | 10/2020 | El-Gayyar | H05B 47/10 |
| 10,869,371 B1 * | 12/2020 | Love | H05B 45/10 |

(Continued)

FOREIGN PATENT DOCUMENTS

| | | | | |
|---|---|---|---|---|
| TW | 201322825 A * | 6/2013 | | H05B 45/37 |
| WO | WO-2017024185 A1 * | 2/2017 | | F21V 23/0471 |

*Primary Examiner* — Seokjin Kim
(74) *Attorney, Agent, or Firm* — Eckert Seamans Cherin & Mellott, LLC (57) ABSTRACT

A dimmer switch system for dimming a load includes a master dimmer structured to be electrically connected to a power source and the load and to control dimming of the load by regulating power provided from the power source to the load, and at least one accessory dimmer structured to be electrically connected to the master dimmer via a traveler conductor. The master dimmer is structured to generate a first control signal on the traveler conductor to indicate a type of the master dimmer, and the at least one accessory dimmer is structured to selectively enable or disable one or more functions of the at least one accessory dimmer based on the type of the master dimmer.

10 Claims, 5 Drawing Sheets

(56) References Cited

U.S. PATENT DOCUMENTS

| | | | |
|---|---|---|---|
| 2009/0278479 A1* | 11/2009 | Platner | H05B 47/175 |
| | | | 340/309.9 |
| 2017/0135184 A1* | 5/2017 | Fischer | H05B 47/18 |
| 2018/0042089 A1* | 2/2018 | Cho | H05B 47/18 |
| 2019/0166678 A1* | 5/2019 | Raneri | H05B 47/185 |
| 2021/0045202 A1* | 2/2021 | Brogan | H05B 39/06 |
| 2021/0195719 A1* | 6/2021 | Raghavani | H04W 4/80 |

* cited by examiner

AUTO DETECTION OF TYPE OF DEVICE USING SINGLE WIRE TWO-WAY COMMUNICATION

CROSS-REFERENCE TO RELATED APPLICATION

This application is a continuation of, and claims priority to U.S. patent application Ser. No. 16/724,937, filed Dec. 23, 2019, "AUTO DETECTION OF TYPE OF DEVICE USING SINGLE WIRE TWO-WAY COMMUNICATION", the contents of which are hereby incorporated herein by reference.

BACKGROUND

Field

The disclosed concept relates generally to dimmer switches, and in particular, to dimmer switch systems with multiple dimmer switches. The disclosed concept also relates to structures and methods for selectively enabling device functionality within dimmer switch systems.

Background Information

Dimmer switches provide a dimming function for loads such as lights. Dimmer switch systems may comprise a single dimmer or multiple dimmers arranged, for example, as a master dimmer and one or more accessory dimmers. Other devices, such as a three-way toggle switch may also be employed in dimmer switch systems. In a dimmer system comprising multiple dimmers or other devices, the multiple dimmers or other devices likely need a mechanism to communicate with each other. For example, the master dimmer may need to provide updates regarding the dimming status of the load to the accessory dimmers or other devices connected to it. A mechanism for indicating the functionality of each device to the other devices in the system may be useful as well.

Communication between dimmers or other devices may be facilitated by either one or more traveler wires connecting the dimmers or other devices. Systems with a single traveler wire can be problematic as conflicts can arise when multiple dimmers or other devices simultaneously attempt to communicate via the single traveler wire.

There is thus room for improvement within dimmer switch systems.

SUMMARY

These needs and others are met by embodiments of the disclosed concept in which a dimmer switch system includes a master dimmer and at least one accessory device, where the master dimmer and accessory device communicate using a single traveler wire, with the master dimmer transmitting signals during one portion of the power supply phase and the accessory device transmitting signals during another portion of the power supply phase. In addition, each of the master dimmer and accessory device is capable of detecting a functionality type of other devices in the dimmer switch system.

In accordance with one aspect of the disclosed concept, a dimmer switch system for dimming a load comprises: a master dimmer structured to be electrically connected to a power source and the load and to control dimming of the load by regulating power provided from the power source to the load; and at least one accessory dimmer structured to be electrically connected to the master dimmer via a traveler conductor, wherein the master dimmer is structured to generate a first control signal on the traveler conductor to indicate a type of the master dimmer, and wherein the at least one accessory dimmer is structured to selectively enable or disable one or more functions of the at least one accessory dimmer based on the type of the master dimmer.

In accordance with another aspect of the disclosed concept, a method of detecting a functionality type of a dimmer for a dimmer switch system, the method comprising: providing a master dimmer electrically connected to a power source and a load and controlling dimming of the load by regulating power provided from the power source to the load with the master dimmer; providing at least one accessory dimmer electrically connected to the master dimmer via a traveler conductor; generating a first control signal on the traveler conductor with the master dimmer to indicate a type of the master dimmer; and selectively enabling or disabling one or more functions of the at least one accessory dimmer based on the type of the master dimmer.

In accordance with another aspect of the disclosed concept, a dimmer switch system for dimming a load comprises: a master dimmer structured to be electrically connected to a power source and the load and to control dimming of the load by regulating power provided from the power source to the load; and a number of accessory devices connected to the master dimmer via a traveler conductor, wherein the number of accessory devices are of an accessory functionality type, and wherein the master dimmer is structured to monitor the traveler conductor and to determine the accessory functionality type of at least one accessory device based on said monitoring.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "processing unit" shall mean a programmable analog and/or digital device that can store, retrieve, and process data; a microprocessor; a microcontroller; a microcomputer; a central processing unit; or any suitable processing device or apparatus.

Modern dimmer switch systems use a variety of technology, including non-radio frequency, Z-wave, Bluetooth, and Bluetooth low energy, among others. Producing dimmer switch systems using accessory dimmers compatible with only a single technology functionality type of master dimmer necessitates keeping a greater number of unique accessory dimmer product in stock and bars the ability to use accessory dimmers of one technology functionality type with a master dimmer of a different technology functionality type, for example, in the event that a particular functionality type of accessory dimmer is in low supply. Use of accessory dimmers that are compatible with master dimmers of multiple technology functionality types necessitates that the master dimmer and accessory dimmers in a particular dimmer switch system be able to communicate regarding what the functionality type of the master dimmer is in that particular system.

Figure 1A:
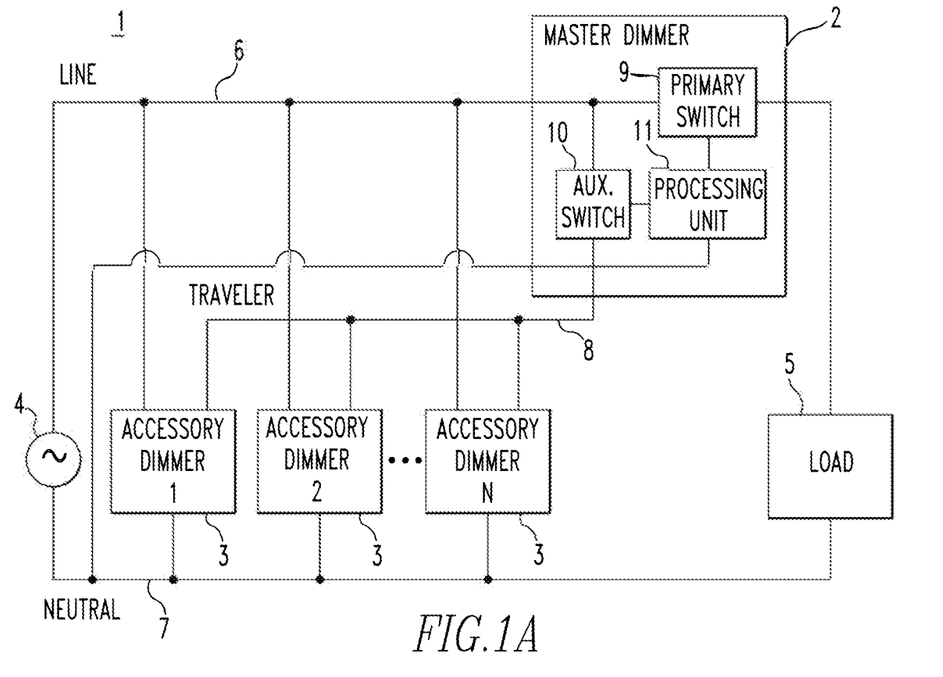
FIG. 1A is a schematic diagram of a dimmer switch system including a master dimmer and number of accessory dimmers in accordance with an example embodiment of the disclosed concept.

FIG. 1A is a schematic diagram of a dimmer switch system 1 including a master dimmer 2 and number of accessory dimmers 3 in accordance with an example embodiment of the disclosed concept. A number N of accessory dimmers 3 is shown in FIG. 1A, and it will be appreciated that dimmer switch system 1 can include one accessory dimmer 3 or more than one accessory dimmer 3 without departing from the scope of the disclosed concept. The master dimmer 2 and accessory dimmers 3 are electrically connected to a power source 4 via line and neutral conductors 6,7 and are powered by the power source 4. The master dimmer 2 is electrically connected between the power source 4 and a load 5. Master dimmer 2 and accessory dimmers 3 are electrically connected to one another by a traveler conductor 8. Master dimmer 2 includes a primary semiconductor switch 9, a master auxiliary semiconductor switch 10, a master processing unit 11, and a first load status indicator 12 (shown in FIG. 2A). First load status indicator 12 provides an indication of how much power is being provided to the load. In an exemplary embodiment, primary semiconductor switch 9 and master auxiliary semiconductor switch 10 are TRIAC switches. However, it will be appreciated that other types of semiconductor switches may be employed without departing from the scope of the disclosed concept. Primary semiconductor switch 9 is electrically connected between power source 4 and load 5 by line conductor 6 and directly regulates the amount of power provided to load 5 by power source 4. Dimming of the load is achieved by changing the conduction angle of primary semiconductor switch 9. Adjusting the conduction angle of primary semiconductor switch 9 produces proportional adjustments to the amount of power provided to load 5, for example by performing forward or reverse phase cutting of the power provided to the load 5.

Figure 1B:
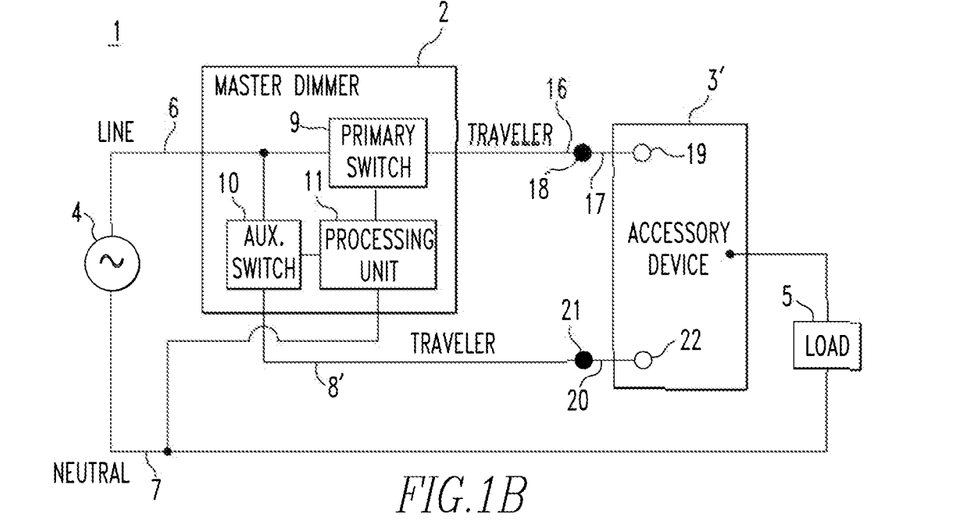
FIG. 1B is a schematic diagram of a dimmer switch system including a master dimmer and three-way toggle switch accessory device in accordance with an example embodiment of the disclosed concept.

FIG. 1B is a schematic diagram of a dimmer switch system 1 including a master dimmer 2 and a three-way toggle switch accessory device 3' in accordance with an example embodiment of the disclosed concept. While a single three-way toggle switch accessory device 3' is shown in FIG. 1B, it will be appreciated that dimmer switch system 1 can include one three-way toggle switch accessory device 3' or more than one three-way toggle switch accessory device 3' without departing from the scope of the disclosed concept. The master dimmer 2 and three-way toggle switch accessory device 3' are electrically connected to a power source 4 via line and neutral conductors 6,7. Master dimmer 2 and accessory device 3' are electrically connected to one another by a first traveler conductor 8' and a second traveler conductor 16. First traveler conductor 8' is set up for 2-way communication between master dimmer 2 and accessory device 3', while second traveler conductor 16 is used for regulating power provided to load 5 from power source 4. Toggling accessory device 3' will move conductor 17 between an open position, where there is no electrical connection between terminal 18 and terminal 19, and a closed position, where terminal 18 and terminal 19 are electrically connected. Conductor 20 remains in a closed position between terminal 21 and terminal 22. When conductor 17 is in the open position, load 5 receives no power from power source 4. When conductor 17 is in the closed position, load 5 may receive power from power source 4, with the amount of power that load 5 receives being regulated by the conduction angle of primary semiconductor switch 9 of master dimmer 2.

Figure 2A:
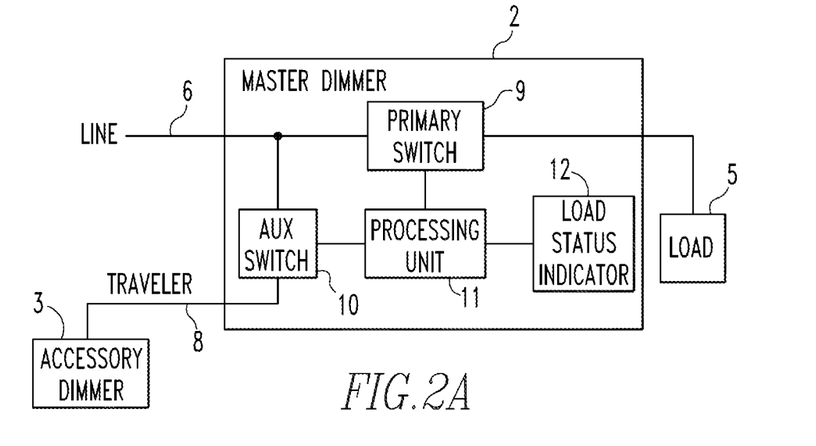
FIG. 2A is a schematic diagram of the master dimmer of FIG. 1A shown in more detail in accordance with an example embodiment of the disclosed concept.
Figure 2B:
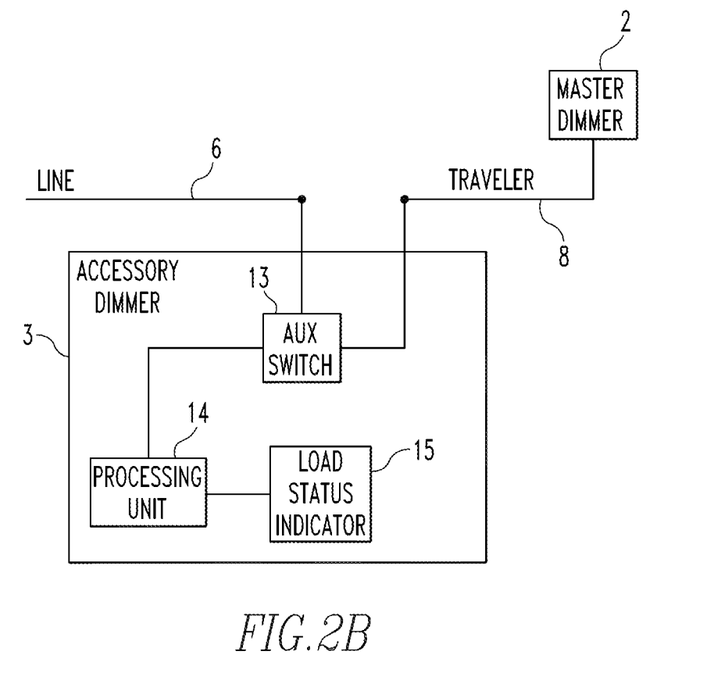
FIG. 2B is a schematic diagram of an accessory dimmer of FIG. 1A shown in more detail in accordance with an example embodiment of the disclosed concept.

FIGS. 2A and 2B are schematic diagrams of master dimmer 2 and accessory dimmers 3 of FIG. 1A shown in more detail in accordance with example embodiments of the disclosed concept. Master auxiliary semiconductor switch 10 is electrically connected between line conductor 6 and traveler conductor 8, which in turn is connected to accessory dimmers 3. Master processing unit 11 is electrically connected to primary semiconductor switch 9 and auxiliary semiconductor switch 10. Master processing unit 11 is structured to adjust the conduction angle of primary semiconductor switch 9 based on, for example, signals received from accessory dimmers 3 or adjustments received at master dimmer 2. Master processing unit 11 is also structured to control master auxiliary semiconductor switch 10 to selectively allow power to flow from line conductor 6 to traveler conductor 8. Said power flowing to traveler conductor 8 operates as a control signal that is provided to other components electrically connected to traveler conductor 8.

In FIG. 2B, accessory dimmer 3 includes an accessory auxiliary semiconductor switch 13, an accessory processing unit 14, and a second load status indicator 15. Accessory auxiliary semiconductor switch 13 is electrically connected between line conductor 6 and traveler conductor 8. Accessory auxiliary semiconductor switch 13 is also electrically connected to accessory processing unit 14. Accessory auxiliary processing unit 14 is structured to control accessory auxiliary switch 13 to selectively allow power to flow from line conductor 6 to traveler conductor 8. Said power flowing to traveler conductor 8 operates as a control signal that is provided to other components electrically connected to traveler conductor 8. Accessory dimmer also include a second load status indicator 15. Second load status indicator 15 provides an indication of how much power is being provided to the load.

The present disclosure presents apparatuses and methods that use accessory dimmers with the same hardware and firmware that are capable of selectively enabling features in order to be compatible with master dimmers of different technology functionality types. Once master dimmer 2 determines what functionality type it has, master dimmer 2 communicates its functionality type to all accessory dimmers 3 and all accessory dimmers 3 select a mode of operation in which to operate, selectively enabling and/or disabling firmware features that correspond to the functionality type of master dimmer 2, as described in further detail herein. Producing accessory dimmers with uniform hardware and firmware that can selectively enable features in order to be compatible with master dimmers of different technology functionality types streamlines stock-keeping and manufacturing processes for producers of dimmer switch systems 1, as compared to producing dimmer switch systems 1 with accessory dimmers that are compatible with only a single technology functionality type of master dimmer.

In an example embodiment of dimmer switch system 1 of the disclosed concept, master processing unit 11 determines the technology functionality type of master dimmer 2. In an example embodiment, the technology functionality type of master dimmer 2 is one of radio frequency, non-radio frequency, Z-wave, Bluetooth, and Bluetooth low energy. However, it will be appreciated that different functionality types may be employed without departing from the scope of the disclosed concept. Master processing unit 11 then controls master auxiliary semiconductor switch 10 to close to allow power from line conductor 6 to flow to traveler conductor 8, which acts as a control signal that is received by all accessory dimmers 3 connected to traveler conductor 8 indicating the functionality type determined by master processing unit 11. Information is encoded into the control signal based on an amount of time after a zero crossing in power from power source 4 that power from line conductor 6 is allowed to flow onto traveler conductor 8. For example and without limitation, generating the control signal 0.5 ms after the zero crossing may indicate a radio frequency functionality type and generating the control signal 1.5 ms after the zero crossing may indicate a non-radio frequency functionality type. Accessory processing unit 14 within each accessory dimmer 3 selects a mode of operation for the accessory dimmer 3 based on the control signal received via traveler conductor 8 to correspond to the functionality type determined by master processing unit 11. Accessory processing unit 14 implements the selected mode of operation by enabling and/or disabling functions of accessory dimmer 3 corresponding to the selected mode of operation. For example, one mode of operation corresponding to one type of master dimmer 2 may have one set of enabled and disabled functions while another mode of operation corresponding to another type of master dimmer 2 may have another set of enabled and disabled functions.

In an example embodiment, the accessory processing unit 14 of each accessory dimmer 3 controls accessory auxiliary semiconductor switch 13 to allow power to flow from line conductor 6 onto traveler conductor 8, which serves as a control signal to master processing unit 11 indicative of a request for the functionality type of master dimmer 2, and master processing unit 11 sends a control signal indicating the functionality type to all of the accessory dimmers 3 in response to the request from the accessory dimmers 3. For example, accessory dimmers 3 may be structured to generate the control signal on traveler conductor 8 to request the functionality type of master dimmer 2 upon powering on of the accessory dimmer 3. In this manner, an accessory dimmer 3 that has just powered on can receive the responsive control signal from master dimmer 2 indicative of its type and accordingly enable and/or disable functions corresponding to the type of master dimmer 2.

Figure 3A:
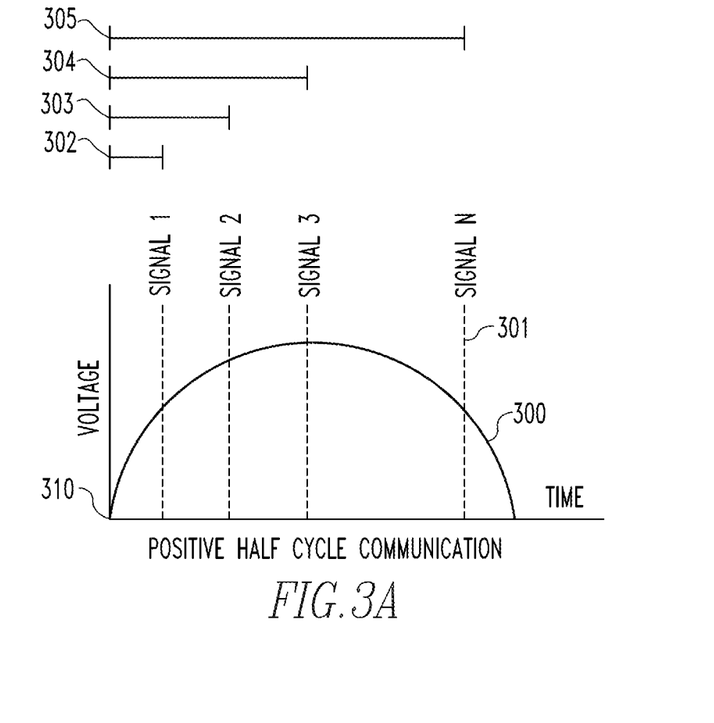
FIGS. 3A and 3B are graphs of predetermined time delays of signals transmitted from the master dimmer and an accessory dimmer during single polarity half-cycles of power from the power supply in accordance with an example embodiment of the disclosed concept.
Figure 3B:
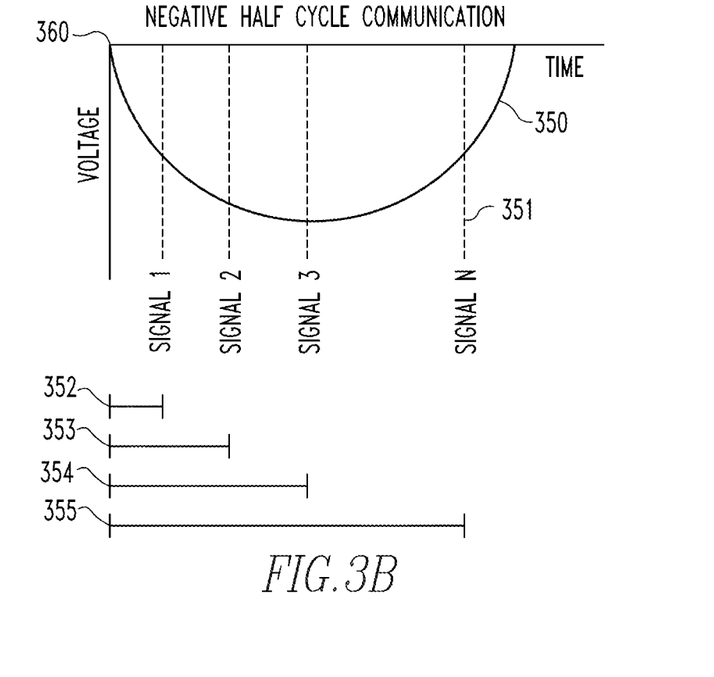

In FIG. 1A, the communication scheme of dimmer switch system 1 utilizes only one traveler conductor 8 for communication with accessory dimmers 3 and is bidirectional, such that master dimmer 2 is able to transmit signals to accessory dimmers 3 through traveler conductor 8, and accessory dimmers 3 are also able to transmit signals to master dimmer 2 through traveler conductor 8. Power provided by power source 4 is AC and thus has both positive half-cycles and negative half-cycles of power. FIG. 3A shows a graph of a positive half-cycle 300 of power with control signals 301 transmitted after various time delays 302, 303, 304, 305 from the zero edge crossing 310 for the positive half-cycle 300 of power. FIG. 3B shows a graph of a negative half-cycle 350 of power with control signals 351 transmitted after various time delays 352, 353, 354, 355 from the zero edge crossing 360 for the negative half-cycle of power. Bidirectional communication in dimmer switch system 1 is achieved by either assigning master dimmer 2 to transmit control signals only during positive half-cycles 300 and assigning accessory dimmers 3 to transmit control signals only during negative half-cycles 350, or by assigning master dimmer 2 to transmit control signals only during negative half-cycles 350 and assigning accessory dimmers 3 to transmit control signals only during positive half-cycles 300. It will be appreciated that, so long as master dimmer 2 transmits control signals during the half-cycle of power opposite in polarity from the half-cycle of power in which accessory dimmers 3 transmit control signals, either type of dimmer may transmit signals during positive half-cycles 300 and either type of dimmer may transmit control signals negative half-cycles 350 without departing from the scope of the disclosed concept. Master processing unit 11 and accessory processing units 14 all contain edge detection circuitry such that, at any given point in time, all of the processing units know when the last zero edge crossing 310 or 360 for the current polarity half-cycle of power occurred and whether the power flowing through the dimmer switch system is in a positive half-cycle 300 or a negative half-cycle 350.

In the dimmer switch system 1 as shown in FIG. 1A, accessory dimmers 3 may communicate to master dimmer 2, for example, a request for the functionality type of master dimmer 2, and master dimmer 2 may communicate to the accessory dimmers 3, for example, what the functionality type of master dimmer 2 is by transmitting control signals 301 or 351 via traveler conductor 8. As described above, the control signals are generated in an example embodiment of the disclosed concept by controlling a master or auxiliary semiconductor switch 10, 13 to allow power to flow from line conductor 6 onto traveler conductor 8 a predetermined time delay from a zero edge crossing 310 or 360. Master processing unit 11 and accessory processing units 14 are all programmed to cause control signals 301 or 351 with predetermined time delays of various lengths, such as 302, 303, 304, 305, 352, 353, 354, or 355, such that each unique length of time delay from a zero edge crossing 310 or 360 corresponds to a unique control signal. The depiction of time delays 302, 303, 304, 305, 352, 353, 354, or 355 is for illustrative purposes, and it will be appreciated that signals can be transmitted on time delays of any length from zero edge crossings 310 and 360 without departing from the scope of the disclosed concept. When master processing unit 11 receives control signals 351 on any non-zero time delay from a zero edge crossing 360, master processing unit 11 determines that master dimmer 2 is connected to an accessory dimmer 3. When master processing unit 11 instead receives control signal 351 with no time delay from zero edge crossing 360, master processing unit 11 determines that master dimmer 2 is connected to a three-way toggle switch accessory device 3'. Due to conductor 20 remaining in a closed position between terminal 21 and terminal 22 in FIG. 1B, master processing unit 11 only receives full half-cycles of power from accessory device 3'.

In one example, master dimmer 2 is assigned to transmit signals only during positive half-cycles 300 and accessory dimmers 3 are assigned to transmit signals only during negative half-cycles 350. Both master processing unit 11 and accessory processing units 14 start timers upon detecting a zero edge crossing 310 or 360. When master processing unit 11 needs to transmit a signal 301 to accessory dimmers 3 to indicate the that master processing unit 11 has determined the functionality type of master dimmer 2, master processing unit 11 waits a length of time equal to the predetermined time delay 305 corresponding to the determined functionality type, and turns master auxiliary semiconductor switch 10 to an ON state. When master auxiliary semiconductor switch 10 turns to an ON state, accessory processing units 14 detect the control signal on traveler conductor 8 and stop their timers. Accessory processing units 14 then select their mode of operation to selectively enable features that correspond to the functionality type of master dimmer 2 based on the control signal. The time measured by the timer of accessory processing unit 14 is equal to the predetermined time delay 305 on which master processing unit 11 turned master auxiliary semiconductor switch 10 to an ON state. Accessory processing units 14 interpret the time delay measured by their timers to represent the functionality type associated with the predetermined time delay 305 and select their mode of operation based on the control signal accordingly.

In the same example, when one of accessory processing units 14 needs to transmit a signal to master dimmer 2 requesting the functionality type of master dimmer 2, the one accessory processing unit 14 waits a length of time equal to the predetermined time delay 355 corresponding to the request for the functionality type of master dimmer 2, and turns its accessory auxiliary semiconductor switch 13 to an ON state. When the accessory auxiliary semiconductor switch 13 turns to an ON state, master processing unit 11 detects the control signal on traveler conductor 8 and stops its timer. The time measured by the timer of master processing unit 11 is equal to the predetermined time delay 355 on which the accessory processing unit 14 turned the accessory auxiliary semiconductor switch 13 to an ON state. Master processing unit 11 interprets the time delay measured by its timer to represent the request for the functionality type of master dimmer 2 based on the predetermined time delay 355 and prepares to transmit a response control signal accordingly. Master processing unit 11 subsequently transmits a signal to all accessory dimmers 3 indicating the functionality type of master dimmer 2 as previously described.

In one exemplary embodiment of the disclosed concept, each of the accessory processing units 14 and master processing unit 11 are programmed with an error tolerance such that, if any noise affects the transmission time of the control signal generated by master auxiliary semiconductor switch 10 turning to an ON state or accessory auxiliary semiconductor switch 13 turning to an ON state, accessory processing units 14 and master processing unit 11 would be able to correctly interpret the information encoded in the transmitted control signal. For example, if each accessory processing unit 14 and master processing unit 11 is programmed to have a tolerance of ±200 µs, and a control signal generated 0.5 ms after a zero crossing was not received by each accessory processing unit 14 or master processing unit 11 until 0.65 ms after the zero crossing, each accessory processing unit 14 or master processing unit 11 would still be able to correctly interpret the encoded information as if the signal had been received 0.5 ms after the zero crossing. Similarly, in the same example with a tolerance of ±200 µs, if a control signal generated 0.5 ms after a zero crossing was received 0.35 ms after the zero crossing by each accessory processing unit 14 or master processing unit 11, each accessory processing unit 14 or master processing unit 11 would still be able to correctly interpret the encoded information as if the signal had been received 0.5 ms after the zero crossing. A tolerance of ±200 µs is used for illustrative purposes only and it will be appreciated that error tolerances of other magnitudes may be employed without departing from the scope of the disclosed concept.

Figure 4:
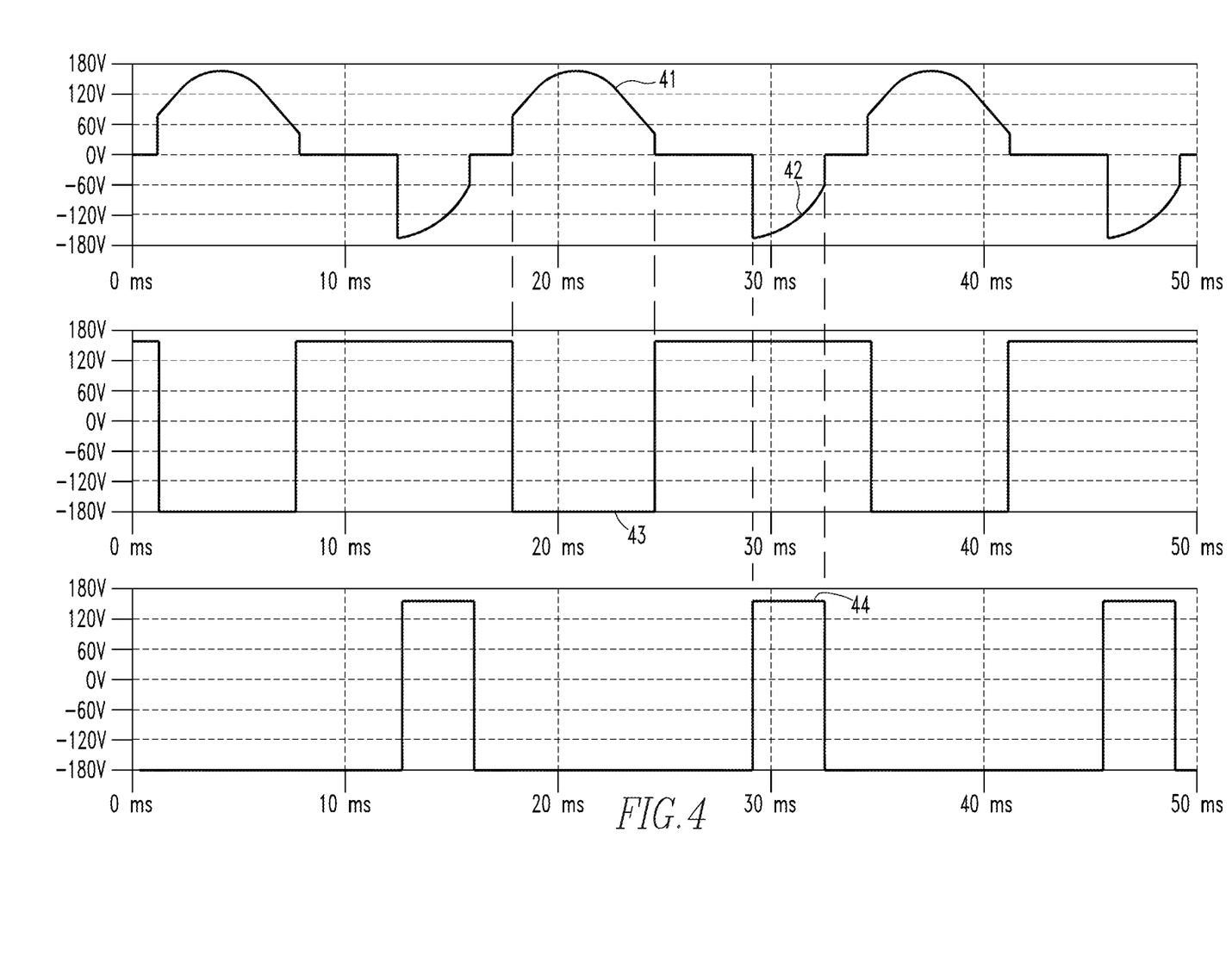
FIG. 4 shows graphs depicting transmission of control signals by the master dimmer and an accessory dimmer during opposite polarity half-cycles of power in accordance with an example embodiment of the disclosed concept.

FIG. 4 shows graphs depicting: (1) master dimmer 2 transmitting signals 301 during positive half-cycles of power 300, (2) accessory dimmers 3 receiving and decoding signals 301 transmitted by master dimmer 2 during positive half-cycles of power 300, (3) an accessory dimmer 3 transmitting signals 351 during negative half-cycles of power 350, and (4) master dimmer 2 receiving and decoding signals 351 transmitted by accessory dimmer 3 during negative half-cycles of power 350 in accordance with an example embodiment of the disclosed concept.

The top graph of FIG. 4 depicts an example waveform of power flowing through traveler conductor 8. As shown in the top graph of FIG. 4, a first control signal 41 is generated on traveler conductor 8 by master dimmer 2 a first predetermined time into a positive half-cycle of power. A second control signal 42 is generated on traveler conductor 8 by an accessory dimmer 3 a second predetermined time into a negative half-cycle of power. The middle graph of FIG. 4 depicts an example of decoded control signals 43 received by an accessory dimmer 3. As shown in the middle graph of FIG. 4, the decoded control signals 43 begin each positive half-cycle in a high state and change to a low state each time a control signal is generated on the traveler conductor 8 during a positive half-cycle. These decoded control signals 43 can be used to determine the predetermined time delay of the control signal from master dimmer 2, and the accessory dimmer 3 can, in turn, perform an action associated with the predetermined time delay. The bottom graph of FIG. 4 depicts an example of decoded control signals 44 received by master dimmer 2. As shown in the bottom graph of FIG. 4, the decoded control signals 44 begin each positive half-cycle in the low state and change to a high state each time a control signal is generated on the traveler conductor 8 during a negative half-cycle. These decoded control signals 44 can be used to determine the predetermined time delay of the control signal from an accessory dimmer 3, and the master dimmer 2 can, in turn, perform an action associated with the predetermined time delay. The graphs shown in FIG. 4 depict master dimmer 2 transmitting signals during positive half-phases of power and accessory dimmers 3 transmitting signals during negative half-phases of power; however, it will be appreciated that master dimmer 2 may transmit signals during negative half-phases of power while accessory dimmers 3 transmit signals during positive half-phases of power without departing from the scope of the disclosed concept. It will be appreciated that the graphs shown in FIG. 4 depict a non-limiting example to aid in understanding the communication scheme between master dimmer 2 and accessory dimmers 3. The various states of the signals and their timing may be modified without departing from the scope of the disclosed concept.

Figure 5:
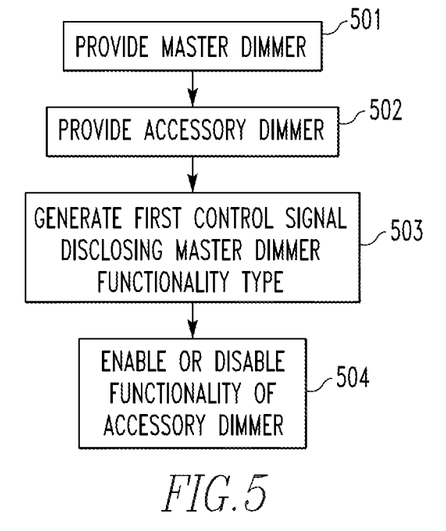
FIG. 5 is a flow chart of a first method of detecting a functionality type of a dimmer for a dimmer switch system in accordance with an example embodiment of the disclosed concept.

FIG. 5 is a flowchart of a first method of setting a mode of operation of an accessory dimmer based on master functionality type in accordance with an example embodiment of the disclosed concept. The method of FIG. 5 may be employed, for example, with dimmer switch system 1 shown in FIGS. 1A, 2A, and 2B and is described in conjunction with dimmer switch system 1 shown in FIGS. 1A, 2A, and 2B. However, it will be appreciated that the method may be employed in other devices as well without departing from the scope of the disclosed concept. The method begins at 501 where master dimmer 2 is provided. At 502, accessory dimmer 3 is provided. At 503, master dimmer 2 generates a first control signal on traveler conductor 8 indicating its functionality type. The first control signal is generated in one of the positive or negative half-cycle of power from power source 4. At 504, the accessory dimmer 3 sets its mode of operation which enables or disables certain functionality features based on the first control signal (e.g., set to operate in a mode compatible with a master dimmer that operates at radio frequency).

Figure 6:
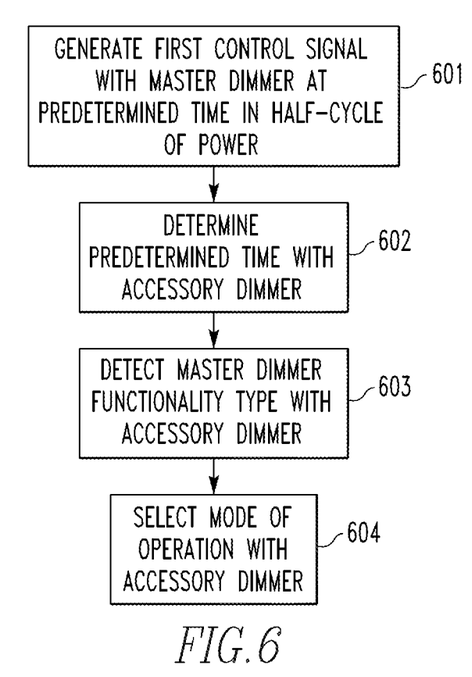
FIG. 6 is a flow chart of a second method of detecting a functionality type of a dimmer for a dimmer switch system in accordance with an example embodiment of the disclosed concept.

FIG. 6 is a flowchart of a second method of setting a mode of operation of an accessory dimmer based on master functionality type in accordance with an example embodiment of the disclosed concept. The method of FIG. 6 may be employed, for example, with dimmer switch system 1 shown in FIGS. 1A, 2A, and 2B and is described in conjunction with dimmer switch system 1 shown in FIGS. 1A, 2A, and 2B. However, it will be appreciated that the method may be employed in other devices as well without departing from the scope of the disclosed concept. The method begins at 601 where master dimmer 2 generates a first control signal at a predetermined time after a zero crossing from the beginning of one of a positive or negative half-cycle of power from power source 4. At 602, accessory dimmer 3 determines the predetermined time after the zero crossing that the first control signal was sent. At 603, accessory dimmer 3 detects the master dimmer functionality type based on the predetermined time. At 604, accessory dimmer 3 selects its mode of operation to be compatible with the master dimmer functionality type (e.g., set to operate in a mode compatible with a master dimmer that uses Z wave technology).

While the disclosed concept has been described in association with disclosing the functionality type of master dimmer 2 and requests for the functionality type of master dimmer 2, it will be appreciated that the control signals described herein may be used in association with other types of information or other types of commands. For example, the communication scheme may be used to send any type of command or information from master dimmer 2 to accessory dimmers 3 and/or from accessory dimmers 3 to master dimmer 2 without departing from the scope of the disclosed concept.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A dimmer switch system for dimming a load, the dimmer switch system comprising:
   a master dimmer structured to be electrically connected to a power source and the load and to control dimming of the load by regulating power provided from the power source to the load; and
   at least one accessory dimmer structured to be electrically connected to the master dimmer via a traveler conductor,
   wherein the master dimmer is structured to generate a first control signal on the traveler conductor to indicate a functionality type of the master dimmer,
   wherein, for each given accessory dimmer of the at least one accessory dimmer, the given accessory dimmer itself is structured to selectively enable or disable one or more functions of the given accessory dimmer based on the functionality type of the master dimmer,
   wherein the at least one accessory dimmer is structured to generate a second control signal on the traveler conductor,
   wherein the master dimmer is structured to generate the first control signal on the traveler conductor in response to the second control signal,
   wherein the master dimmer is structured to generate the first control signal on the traveler conductor during one of a positive or negative half-cycle of power from the power source, and
   wherein the at least one accessory dimmer is structured to generate the second control signal on the traveler conductor during the other of the positive or negative half-cycle of power from the power source.

2. The dimmer switch system of claim 1,
   wherein the at least one accessory dimmer is structured to operate with a plurality of master dimmer functionality types.

3. The dimmer switch system of claim 2,
   wherein the plurality of master dimmer types includes radio frequency and non-radio frequency.

4. The dimmer switch system of claim 1,
   wherein the at least one accessory dimmer is structured to select, among a plurality of modes of operation, the mode of operation that corresponds to the functionality type of the master dimmer, and
   wherein each of the plurality of modes of operation has corresponding enabled or disabled functions of the at least one accessory dimmer.

5. The dimmer switch system of claim 1,
   wherein the master dimmer is structured to generate the first control signal at a selected predetermined time after a zero-crossing in the one of the positive or negative half-cycle of power from the power source, and
   wherein the selected predetermined time corresponds to the functionality type of the master dimmer.

6. The dimmer switch system of claim 1,
   wherein the master dimmer further comprises:
   a first processing unit;
   a primary semiconductor switch structured to be electrically connected between the power source and the load; and
   a first auxiliary semiconductor switch,
   wherein the first auxiliary semiconductor switch is structured to be electrically connected between the power source and the traveler conductor, and
   wherein the first processing unit is structured to control the first auxiliary semiconductor switch to generate the first control signal on the traveler conductor.

7. A method of detecting a functionality type of a dimmer for a dimmer switch system, the method comprising:
- providing a master dimmer electrically connected to a power source and a load and controlling dimming of the load by regulating power provided from the power source to the load with the master dimmer;
- providing at least one accessory dimmer electrically connected to the master dimmer via a traveler conductor;
- generating a first control signal on the traveler conductor with the master dimmer to indicate a functionality type of the master dimmer;
- for each given accessory dimmer of the at least one accessory dimmer, selectively enabling or disabling, with the given accessory dimmer, one or more functions of the given accessory dimmer based on the functionality type of the master dimmer,
- generating a second control signal on the traveler conductor with the at least one accessory dimmer;
- generating the first control signal on the traveler conductor with the master dimmer in response to the second control signal;
- generating the first control signal during one of a positive or negative half-cycle of power from the power source; and
- generating the second control signal during the other of the positive or negative half-cycle of power from the power source.

8. The method of claim 7, further comprising:
- selecting with the at least one accessory dimmer, among a plurality of modes of operation, the mode of operation that corresponds to the functionality type of the master dimmer,
- wherein each of the plurality of modes of operation has corresponding enabled or disabled functions of the at least one accessory dimmer.

9. The method of claim 7, further comprising:
- generating the first control signal at a selected predetermined time after a zero crossing in the one of the positive or negative half-cycle of power from the power source,
- wherein the selected predetermined time corresponds to the functionality type of the master dimmer.

10. The method of claim 7, further comprising:
- providing the master dimmer with:
  - a first processing unit;
  - a primary semiconductor switch electrically connected between the power source and the load; and
  - a first auxiliary semiconductor switch electrically connected between the power source and the traveler conductor; and
- generating the first control signal on the traveler conductor by controlling the first auxiliary semiconductor switch with the first processing unit.

* * * * *